C. J. BORGESON.
ROCK DRILL FASTENING.
APPLICATION FILED NOV. 15, 1915.
1,236,664.
Patented Aug. 14, 1917.
2 SHEETS—SHEET 1.
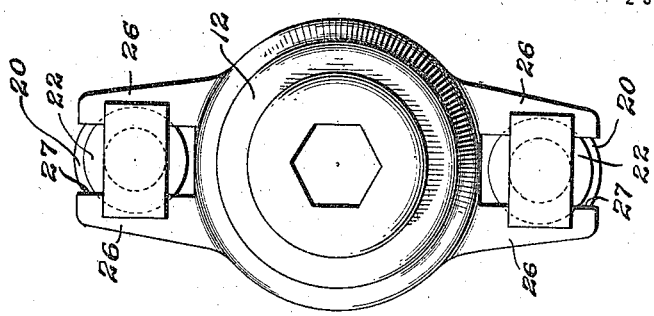
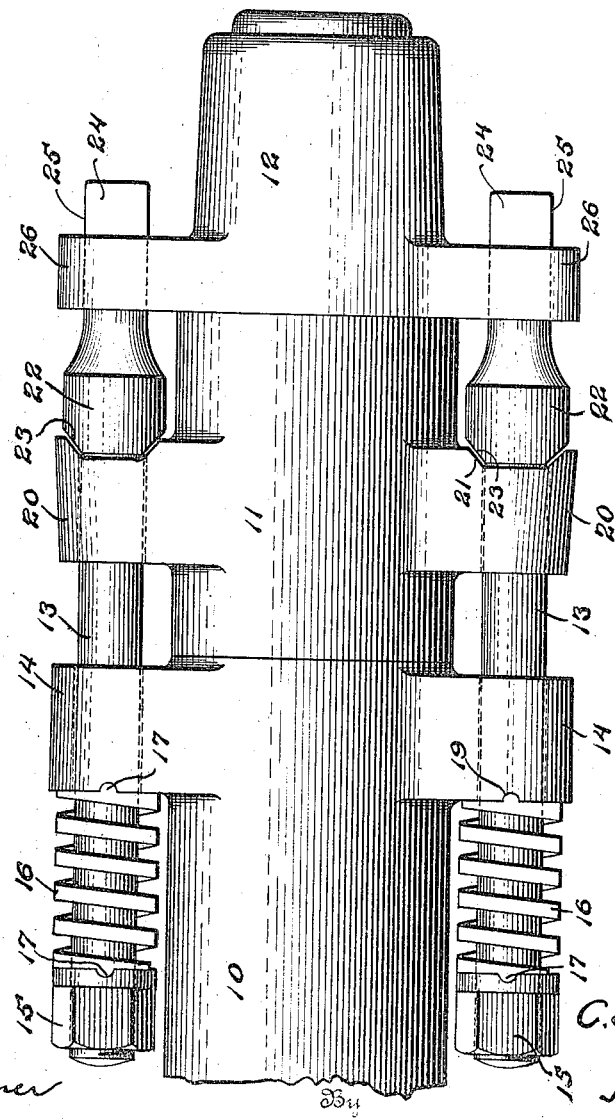
Inventor
C. J. Borgeson C. J. BORGESON.
ROCK DRILL FASTENING.
APPLICATION FILED NOV. 15, 1915.
1,236,664.
Patented Aug. 14, 1917.
2 SHEETS—SHEET 2.
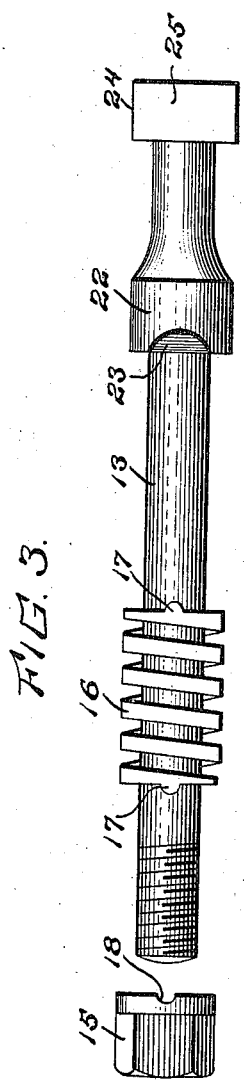
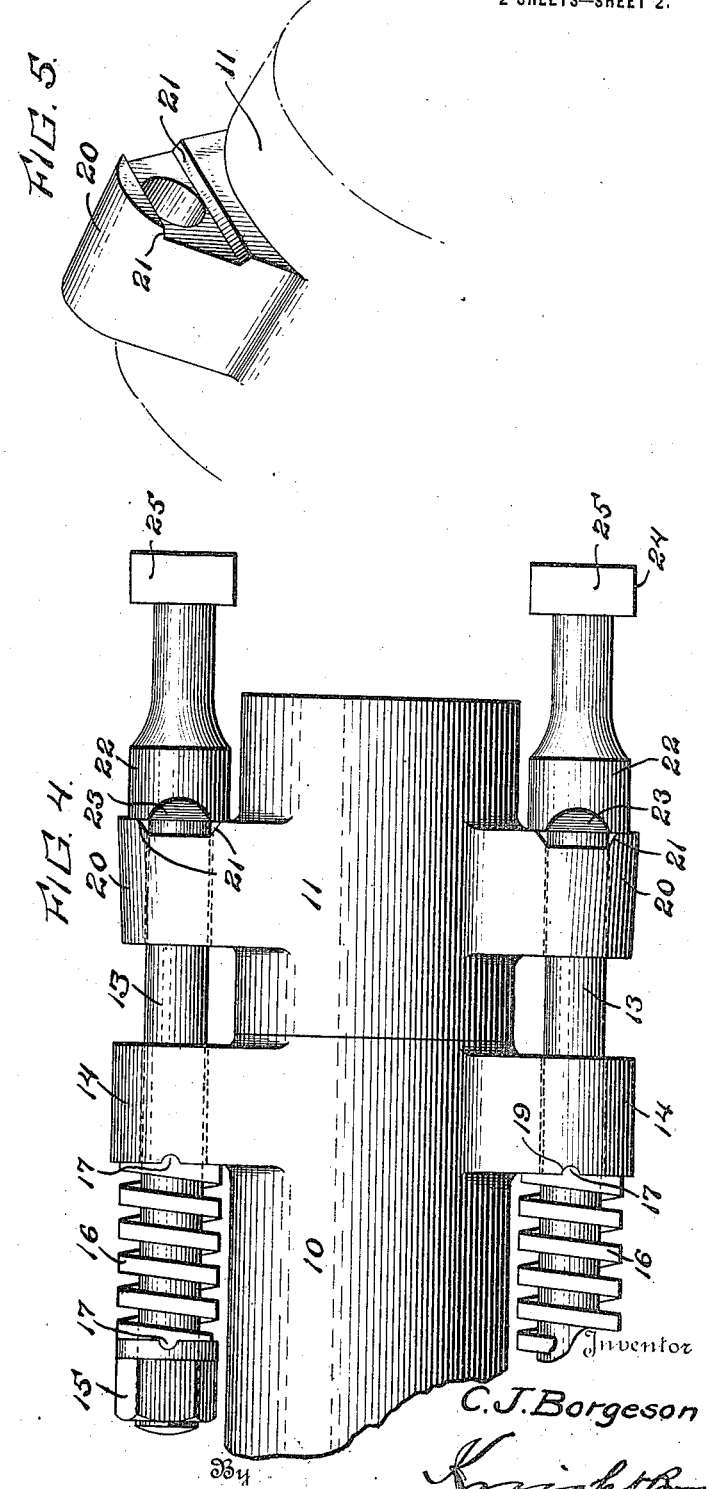
Witness
A. M. Frogner
Inventor
C. J. Borgeson
By Knight Bros
Attorneys

UNITED STATES PATENT OFFICE.

CHARLES J. BORGESON, OF SYRACUSE, NEW YORK, ASSIGNOR TO THE PNEUMELECTRIC MACHINE COMPANY, OF SYRACUSE, NEW YORK, A CORPORATION OF NEW YORK.

ROCK-DRILL FASTENING.

1,236,664. Specification of Letters Patent. Patented Aug. 14, 1917.

Application filed November 15, 1915. Serial No. 61,637.

*To all whom it may concern:*

Be it known that I, CHARLES J. BORGESON, a citizen of the United States, residing at Syracuse, in the county of Onondaga and State of New York, have invented certain new and useful Improvements in Rock-Drill Fastenings, of which the following is a specification.

The present invention relates to the fastening together of several removable parts on rock drills. This device provides not only a very secure fastening, but makes an elastic connection between the chuck housing and the chamber on the one hand and the rock drill cylinder or the main portion of the rock drill on the other hand, and this fastening device is so constructed that by a simple turning of a couple of bolts, the chuck housing is instantly released, so that it can be removed from the rest of the structure while the chamber portion is still retained in position. This is of the greatest importance as it permits the interior of the machine to be easily examined and repairs to, or exchange of the chuck housing and the drill to be made without loss of time.

In the accompanying drawings, one embodiment of the invention is illustrated, and Figure 1 shows a plan view of the forward end of the rock drill;

Fig. 2, a front view of Fig. 1;

Fig. 3, a detail,

Fig. 4, a view similar to Fig. 1 with the chuck housing removed and the fastening device in different positions;

Fig. 5, a perspective view of a detail.

In the figures, the main or body portion of the rock drill has been denoted by 10, and 11 is the detachable chamber part and 12 the chuck housing which is also detachable. The chamber portion and the chuck housing are held in position against the front face of the body portion 10 by means of bolts 13. These bolts are mounted in lugs 14 on the main portion 10 with sufficient play to permit easy turning and axial displacement of the bolts which run parallel to the main axis of the machine. The rear ends of the bolts are threaded to receive nuts 15 between which and the lugs are placed coil springs 16 around the bolts for drawing them rearwardly. To prevent turning of the springs and the nuts, small projections 17 are provided at the ends of the springs which engage in corresponding recesses 18 and 19 provided in the nuts and the rear faces of the lugs 14. It will thus be seen that on turning the bolts they will be advanced or retracted according to the direction of the turning, while the springs and nuts are not turning.

The chamber portion 11 which contains the dolly pin and turning device for the rock drill is also provided with a pair of lugs 20 which are placed in alinement with the lugs 14 on the body portion of the rock drill. These lugs are similarly provided with holes larger than the diameter of the bolts to permit free movement of the latter but the front face of each lug 20 is provided with a recess with straight bevel faces 21. These recesses are cut transversely across the lugs and in the direction perpendicular to the plane of the drawing as seen in Fig. 1. The bolts 13 are provided with a boss or collar 22 having bevels 23 on opposite sides of the bolts. These bevels have the same angularity as the bevels 21 and the larger recesses and register therewith when all the parts are assembled and locked together as shown in Fig. 1, leaving however, a small play between the recess and the collar 22.

At the forward end of each bolt is provided a head 24 which is flattened on two opposite sides 25 to approximately the same thickness as the diameter of the bolt. These flat sides 25 are arranged on the same sides of the bolts as the bevels 23.

The chuck housing 12 has at its base, a pair of ears 26 with an outwardly open cut 27 for receiving the bolts 13. These cuts correspond in width and depth to the size of the bolt heads 24 so that when the bolts are turned in one direction, the chuck housing is released and can be removed axially from the rest of the rock drill, but with the bolts turned at 90° to the free position, the projecting ends of the head will engage with the front faces of each of the lugs. The relative positions of the heads, collars, nuts and bolts, have been selected so that with the heads in locked position the springs 16 will be considerably compressed, throwing the bolts rearwardly and holding the chuck housing and the chamber portion practically thrown up against the rock drill cylinder of the body portion 10, but leaving a space between the collars 22 and the recess in the lug 20. This is best shown in Figs.

1 and 2. When the bolts are turned 90° from the locked position as shown in Fig. 4, and during the first part of the turning the bevels 23 on the bolt collars will engage with the bevels, Fig. 1, in the recess forcing the bolts outwardly against the pressure of the springs until finally the collars have entirely left the recesses and engage with their rearward faces on the foremost surface of the lugs 20, while the flat sides 25 of the bolt heads 24 on the completion of the 90° turning now stand in alinement with the sides of the cut in the ears 26 so that the chuck housing has been released and can be removed. The chamber portion is, however, held by the collars 22 engaging with the front face of the lugs 20. During the turning of the bolt 90° the threaded end thereof is unscrewed a quarter of the turn in the nuts 15; this loss has been made up by the outward movement of the bolts caused by the engagement of the bevels on the collar and the recess, so that the rearward pressure against the chamber portion 11 is approximately the same as when the chamber housing is in position.

The function of the springs 16 is threefold, namely, to create a pressure for holding the parts together, secondly, to retain the bolts securely in either of their two positions, locked or unlocked, and thirdly, to provide a flexible connection between the cylinder or body portion of the rock drill and the chamber portion 11 and chuck housing 12. This feature is very important when the hammer, moving in the cylinder 10 strikes the end of the cylinder instead of the dolly pin which will happen when the drill is withdrawn from the rock, and previous to the stopping of the machine, or else, when the drill steel breaks; in other words, when there is no rearward resistance to the point of the rock drill.

I claim:—

1. A fastening device for securing a plurality of removable organs to a body portion of a machine; said device comprising a securing member mounted to turn in said body portion and provided with yielding means tending to draw said organs toward said body portion, locking means actuated by said securing member engaging with the outermost one of said organs when the securing member has one angular position and releasing the same when in another angular position; said outermost organ retaining the other of said organs in place when in such engagement and said securing member retaining the other of said organs in place after the removal of the outermost organ.

2. A fastening device for securing a plurality of removable organs to a body portion of a machine; said device comprising a securing member mounted to turn in said body portion and provided with yielding means tending to draw said organs toward said body portion, locking means actuated by said securing member engaging with the outermost one of said organs when the securing member has one angular position and releasing the same when in another angular position; said outermost organ retaining the other of said organs in place when in such engagement, and other means actuated by said securing member engaging with said other organs when the securing member is in its other angular position, for the purpose of securing said other organs on said body portion independent of said outermost organ.

3. A fastening device for securing a first and a second removable organ to a body portion of a machine and in alinement with its main axis; said device comprising bolts axially movable and revolubly mounted in said body portion and parallel to the main axis, springs tending to draw the bolts axially backward, a flat sided head on the free end of each bolt, the first removable organ having lugs constructed to engage with said heads when the bolts are standing in one angular position, said lugs being provided with slots for passing said heads when the bolts are standing in their other angular position, said second organ being held in position between said fixed portion and said first organ through the coöperation of said springs, bolts and first organ during such engagement, there being securing means provided between said bolts and said second organ, said means automatically interengaging upon the removal of said first organ, thus retaining said second organ alone in position.

4. A fastening device for securing a first and a second removable organ to a body portion of a machine and in alinement with its main axis; said device comprising bolts revolubly mounted in said body portion and parallel to the main axis, springs tending to draw the bolts axially backward, a flat sided head on the free end of each bolt, the first removable organ having lugs constructed to engage with said heads when the bolts are standing in one angular position, said lugs being provided with slots for passing said heads when the bolts are standing in their other angular position; said second organ having guides for said bolts, a collar on each bolt constructed to engage with the guides and retain the second organ in place when said heads are out of engagement with said lugs.

5. A fastening device for securing a first and a second removable organ to a body portion of a machine and in alinement with its main axis; said device comprising bolts revolubly mounted in said body portion and parallel to the main axis, springs tending to draw the bolts axially backward, a flat sided head on the free end of each bolt, the first removable organ having lugs constructed to engage with said heads when the bolts are standing in one angular position, said lugs being provided with slots for passing said heads when the bolts are standing in their other angular position; said second organ having guides for said bolts, a collar on each bolt constructed to engage with the guides and retain the second organ in place when said heads are out of engagement with said lugs, said collars having beveled surfaces registering without bearing with corresponding surfaces on said guides, when said heads are in their locked position; said beveled surfaces coming into engagement upon the heads being turned out of said engagement, whereby said bolts will be drawn outwardly against said springs.

6. A fastening device for securing a chuck housing and a chamber housing to the body portion of a rock drill, and in alinement with the main axis of the rock drill; said device comprising a pair of bolts revolubly mounted in said body portion and parallel to the main axis, the rear ends of said bolts being threaded, nuts for said threaded bolt ends, springs interposed between said lugs and said nuts tending to draw the bolts rearwardly, means for preventing turning of the springs and nuts relative to said lugs; a flat sided head on the forward end of each bolt, said chuck housing having ears constructed to engage with said heads when the bolts are standing in one position, said ears being provided with slots for passing said heads when the bolts are standing in their other position, said chamber portion having guides for said bolts, a collar on each bolt, bevel surfaces on the adjacent sides of said guide and said collar registering, without contacting, with each other with the bolts in the first angular position, said bevel surface coming into engagement upon the turning of the heads out of said first angular position, whereby said bolts will be drawn outwardly against said springs while partly unscrewed in said nuts until said heads stand in their other angular position when releasing said chuck housing, while said collars with the coöperation of said springs, guides and nuts maintain said chamber portion in place.

The foregoing specification signed at Syracuse, New York, this 18th day of August, 1915.

CHARLES J. BORGESON.